3,792,037
PROCESS FOR PREPARING AMBUTYROSIN
Hiroshi Kawaguchi, Tokyo, Masataka Konishi, Tokohama, and Hiroshi Tsukiura, Tokyo, Japan, assignors to Bristol-Myers Company, New York, N.Y.
No Drawing. Filed Nov. 4, 1971, Ser. No. 195,804
Int. Cl. C07c 47/18
U.S. Cl. 260—210 R    2 Claims

ABSTRACT OF THE DISCLOSURE

The specification discloses a process for preparing ambutyrosin by a semisynthetic procedure comprising the steps of acylating 5-β-D-xylofuranosylneamine or 5-β-D-ribofuranosylneamine.

BACKGROUND OF THE INVENTION

This invention relates to antibiotics and particularly the antibiotic compound known as ambutyrosin. More particularly, the invention is a process for the preparation of ambutyrosin from another antibiotic known as vistamycin.

Ambutyrosin is a known antibotic which is disclosed in U.S. Pat. 3,541,078 along with methods of preparation and separation into various components. Among the components of ambutyrosin are those designated as components A and B. These particular components are isomers differing in the configuration at one carbon in the pentose portion of the molecule. Ambutyrosin A is characterized by the xylose configuration and ambutyrosin B by the ribose configuration.

In general, ambutyrosin B is an N″-4-amino-2-hydroxybutyric acid amide of another antibiotic known as vistamycin. Vistamycin is also referred to in the literature as ribostamycin and antibiotic SF733. This compound, disclosed in Netherlands Pat. 6818105, can be named as a 5-β-D-pentofuranosylneamine.

Ribostamycin is characterized by the ribose configuration in the pentose moiety and, therefore, corresponds to deacylated ambutyrosin B. Ribostamycin can be prepared by fermentation of Streptomyces thermoflavas (ATCC 21294) or a suitable mutant. The fermentation process, isolation, and recovery of the product are disclosed in the Netherlands Pat. 6818105. It will be appreciated that there is also a configuration corresponding to the deacylated ambutyrosin A, i.e., having the xylose configuration. As used herein, the term ambutyrosin is intended to include both A and B as well as mixtures thereof unless the context indicates otherwise.

The term 5-β-D-pentofuranosylneamine, as used herein, is intended to identify the compounds 5-β-D-ribofuranosylneamine and its xylo isomer, 5-β-D-xylofuranosylneamine, and mixtures thereof. Acylation of these compounds on the N″-amino, as shown in structure I, below, provides ambutyrosin as a reaction product.

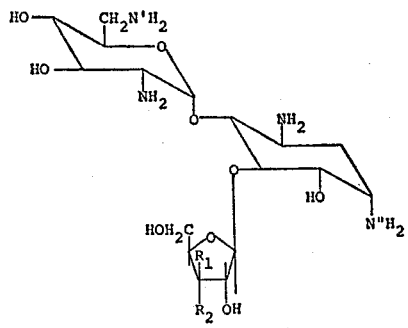

In the above formula, $R_1$ and $R_2$ are either hydrogen or hydroxyl, as required for the ribose or xylose configuration of the pentose group.

By the process of this invention, ambutyrosin is prepared by suitable acylation of 5-β-D-pentofuranosylneamine by reaction with a suitable amino-blocking agent, such as N-(benzyloxycarbonyloxy)succinimide, to protect the most reactive amino group referred to as the N′ group, then acylating the reaction product with N-hydroxysuccinimide ester of L-(—)-γ-benzyloxycarbonylamino-α-hydroxybutyric acid to produce ambutyrosin having blocked aminos and the following structure

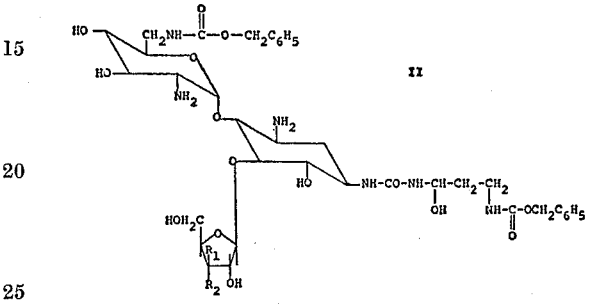

in which $R_1$ and $R_2$ are different, but selected from the group consisting of hydrogen and hydroxy.

The benzyloxycarbonyl blocking groups can then be removed by hydrogenation, via known methods, to provide ambutyrosin.

Ambutyrosin has the structure

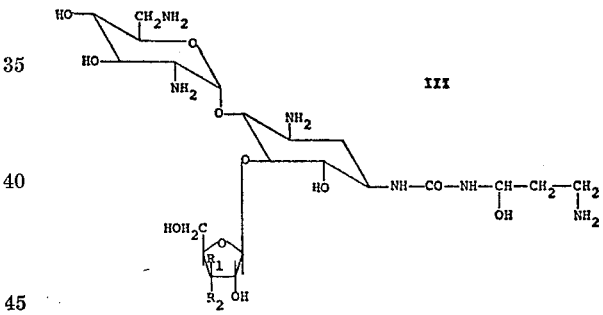

in which $R_1$ and $R_2$ are as defined above.

The amino group in the deoxystreptamine portion of the molecule, i.e., the N″ amino group of Formula I, is the second most reactive amino function. Accordingly, to obtain selective acylation, it is necessary to block or protect the more reactive amino function. For purposes of description, the most reactive amino is identified herein as N′ and the second most reactive as N″. This N″ amino has been determined to be the 1-amino group of the deoxystreptamine moiety.

Selective acylation of the N″ amine can be achieved if the 6′ amino group is suitably protected. The required starting material, 6′-N-carbobenzoxy-5-β-D-pentofuranosylneamine can be prepared in aqueous tetrahydrofuran by the equimolar reaction of 5-β - D - pentofuranosylneamine and N-(benzyloxycarbonyloxy)succinimide. Acylation of the N″ amino function is carried out in aqueous tetrahydrofuran using equimolar amount of the N′-protected compound and the blocked amino acid, i.e., the N-hydroxysuccinimide ester of benzyloxycarbonylamino-α-hydroxybutyric acid. The intermediate product, N′-carbobenzoxy-N″-benzyloxycarbonyl aminoacyl pentofuranosylneamine, can then be hydrogenated over a suitable catalyst, such as palladium-charcoal, to remove both of the protective groups. The final product having the structure III can be recovered by known methods. Depending on the optical rotation of the amino acid, the product can be a racemic mixture or the dextro or levo rotatory forms. The L(—) form is preferred; accordingly, it is preferred that the amino acid be L(—)-α-amino-α-hydroxybutyric acid.

More specifically, the instant process comprises the steps of:

(1) Acylating the N'-amino function of 5-β-D-pentofuranosylneamine with an acylating agent which can be selected from the group consisting of compounds having, inter alia, the following structures

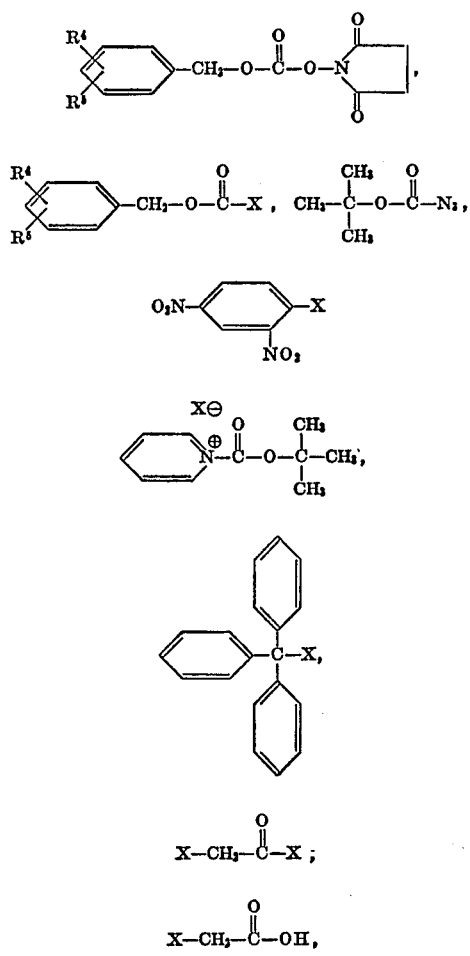

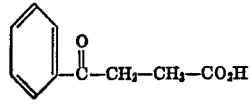

(or a carbodiimide thereof) or

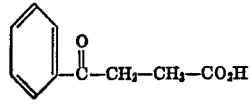

(or a carbodiimide thereof), in which $R^4$ and $R^5$ are alike or different and each is H, F, Cl, Br, $NO_2$, OH, (lower) alkyl or (lower)alkoxy; X is chloro, bromo, or iodo, or a functional equivalent as an acylating agent; in a ratio of one mole or less of acylating agent per mole of pentofuranosylneamine in a solvent, preferably selected from the group comprising dimethylformamide, dimethylacetamide, tetrahydrofuran, dioxane, 1,2-dimethoxyethane, methanol, ethanol, water, acetone, pyridine, N-(lower) alkylpiperidine, or mixtures thereof, but preferably tetrahydrofuran at a temperature below 50° C. and preferably below 25° C., to produce the compound having the formula

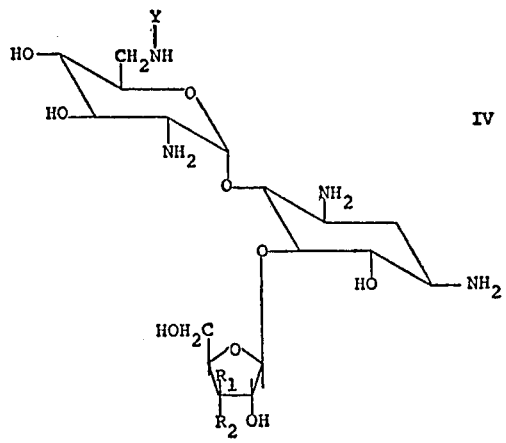

wherein $R_1$ and $R_2$ are as defined above, and Y is the acyl residue of the blocking agents described above;

(2) Acylating Compound IV, above, with an acylating agent of the structure $$W-NH-CH_2-CH_2-\overset{OH}{\underset{}{C}}H-\overset{O}{\underset{}{C}}-M$$

in which W is a radical selected from the group comprising

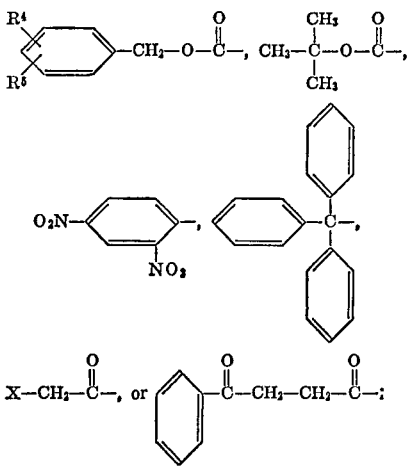

but preferably

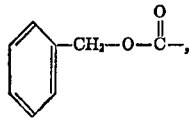

M is a radical selected from the group comprising

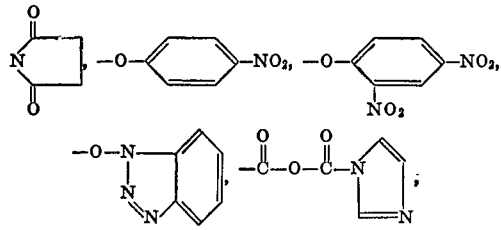

but preferably

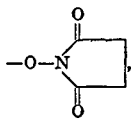

in which R⁴ and R⁵ are as above; in a ratio of at least about one mole of acylating agent per mole of Compound IV, but preferably in a ratio of about 1 to about 1.4, and most preferably in a ratio of about 1 to about 1.1, in a solvent selected from the group comprising a mixture of water and ethyleneglycol dimethyl ether, dioxane, dimethylacetamide, dimethylformamide, tetrahydrofuran, propyleneglycol dimethyl ether, or the like, but preferably about 1:1 water-tetrahydrofuran, to produce a compound of the formula

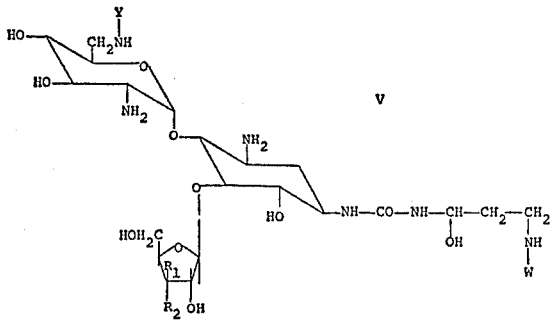

in which W, $R_1$, and $R_2$ are as defined above; and (3) Removing the blocking groups W and Y from Compound V by methods commonly known in the art. When W and Y are radicals of the formula

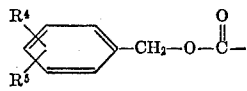

it is preferred that they be removed by hydrogenating Compound V with hydrogen in the presence of a metal catalyst, preferably selected from the group comprising palladium, platinum, Raney nickel, radium, ruthinium and nickel, but preferably palladium, and most preferably palladium on charcoal, in a water-water miscible solvent system, preferably selected from the group comprising water and dioxane, tetrahydrofuran, ethylene-glycol dimethyl ether, propyleneglycol dimethyl ether, or the like, but preferably 1:1 water-dioxane, and preferably in the presence of a catalytic amount of glacial acetic acid to produce the compound of Formula III.

It should be apparent to those knowledgeable in the art that other agents can be used in the process above to acylate the amine functions of the intermediate compounds of the instant invention. This disclosure is meant to include all such acylating agents that produce labile amine-blocking groups, said labile-blocking groups commonly employed in the synthesis of peptides. The labile-blocking groups must be readily removable by methods commonly known in the art. Examples of said labile-blocking groups and their removal can be found in the review of A. Kapoor, "J. Pharm. Sciences," 59, pp. 1-27 (1970). Functionally equivalent acylating agents for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids, such as diphenylacetic acid.

In addition, an acid azide or an active ester or thioester with p-nitrophenol, 2,4-dinitrophenol, thiophenol, thioacetic acid may be used or the free acid itself may be coupled with the amino group [cf. Great Britain 1,008,170 and Novak and Weichet, "Experientia," XXI/6, 360, (1965)] or by the use of enzymes of an N,N'-carbonyldiimidazole or an N,N'-carbonylditriazole [cf. South African patent specification 63/2,684] of a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, "J. Amer. Chem. Soc.," 77, 1067 (1955)] or of alkynylamine reagent [cf. R. Buijile and H. G. Viehe, "Angew. Chem.," International Edition, 3, 582 (1964)], or of a ketenimine reagent [cf. C. L. Stevens and M. E. Monk, "J. Amer. Chem. Soc.," 80, 4065 (1958)] or of an isoxazolium salt reagent [cf. R. B. Woodward, R. A. Olofson and H. Mayer, "J. Amer. Chem. Soc.," 83, 1010 (1961)]. Another equivalent of the acid chloride is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidizolide isolated, but this is not essential. The general methods for carrying out these reactions and the methods used to isolate the products are known in the art, as shown by U.S. Pats. 3,079,314, 3,117,126, and 3,129,224 and British Pats. 932,644 and 959,054.

Ambutyrosin has been shown to have valuable antibacterial properties when prepared by fermentation and has comparable antibacterial characteristics when prepared according to the invention.

The following examples show the preparation of ambutyrosin A, and it will be appreciated that an analogous series of reactions is applicable to the preparation of ambutyrosin B from 5-β-D-xylofuranosylneamine.

In the following examples, the term "DA" is used collectively for $DA_1$ and $DA_2$, which are respectively the xylo and ribo forms of structure I. These compounds have been found to have the same reactivity towards acylating agents and to give acylated derivatives having equivalent biological activity.

Example 1

Preparation of 5-β-D-pentofuranosylneamine: Ambutyrosin A (1.0 gram) in 30 ml. of 0.5 N sodium hydroxide solution was refluxed for one hour, then neutralized with 6 N hydrochloric acid and applied on a column of Amberlite CG–50 ($NH_4^+$ form, 30 ml.). The column was washed with water (ca. 100 ml.) until the ninhydrin test became negative, and then eluted with 0.2 N ammonium hydroxide. Biologically active fractions were collected, concentrated in vacuo to 5 ml. and treated with 5 ml. of methanol to induce precipitation. It was further purified by re-precipitation from aqueous methanol to yield 607 mg. (65%) of deacylated ambutyrosin A, hereafter referred to as $DA_1$. It was analyzed as a carbonate salt.

Analysis.—Calc'd for $C_{17}H_{34}N_4O_{10} \cdot H_2CO_3$ (percent): C: 41.86; H: 7.03; N: 10.85. Found (percent): C: 42.06; H: 7.44; N: 10.71.

The wash water of the above CG–50 column was adjusted to pH 7.0 and applied on a column of Amberlite IR–120 ($H^+$ form, 30 ml.). The column was washed with water and then eluted with 1 N ammonium hydroxide. Ninhydrin-positive fractions were combined, treated with active carbon and neutralized with IRC–50 resin ($H^+$ form). The solution was concentrated to a small volume, treated with ethanol, and kept in the cold overnight to yield 160 mg. (75%) of γ-amino-α-hydroxybutyric acid as colorless needles which melted at 217° C. to 218° C. $[\alpha]_D^{23} = -30.3°$ (c. 1.0, $H_2O$).

The above experiments were also carried out on 1.0 gram of ambutyrosin B yielding 579 mg. (62%) of deacylated ambutyrosin B, hereafter called $DA_2$, which was identified with ribostamycin.

*Analysis.*—Calc'd for $C_{17}H_{34}N_4O_{10} \cdot H_2CO_3$ (percent): C: 41.86; H: 7.03; N: 10.85. Found (percent): C: 42.47; H: 7.55; N: 11.10.

Example 2

Absolute configuration of (−)-γ-amino-α-hydroxybutyric acid: γ-amino-α-hydroxybutyric acid (1.0 gram) obtained above was dissolved in 10 ml. of 15% acetic acid, cooled to 5° C., and to the solution was added 700 mg. of sodium nitrite in 4 ml. of water. The mixture was stirred for two hours at 5° C. and for an additional 18 hours at 20° C., and then concentrated in vacuo to an oil which was taken up into 30 ml. of methylenechloride and dried over anhydrous sodium sulfate. The solvent was evaporated and the remaining oil distilled in vacuo to give 114 mg. of α-hydroxybutyrolactone. B.P. 70° to 75° C./1.5 mm. Hg $\nu_{c=o}$ 1765 cm.$^{-1}$. $[\alpha]_D^{21.2} = -18.3$ (c. 1.18, $H_2O$).

This lactone showed a positive cotton-effect in ORD curve (240 mµ, in N/10 HCl) and, therefore, the absolute configuration of the hydroxy group at the α-carbon was assigned to be L-configuration. (See Okuda et al., "Chem. Pharm. Bull.," 12 (4): 504–506 (1964).)

Example 3

L-(−)-γ-benzyloxycarbonylamino-α-hydroxybutyric acid: L-(−)-γ-amino-α-hydroxybutyric acid (7.4 grams, 0.062 mole) was added to 50 ml. of aqueous sodium hydroxide solution (5.2 grams, 0.13 mole). To the solution was added dropwise 11.7 grams (0.068 mole) of carbobenzoxy chloride with stirring at 0° C. to 5° C. for one hour. The reaction mixture was washed with 50 ml. of ether, adjusted to pH 2 with dilute hydrochloric acid, and extracted with four 80-ml. portions of ether. The extracts were combined, washed with saturated sodium chloride solution, dried over anhydrous sodium sulfate, and filtered. The filtrate was evaporated in vacuo, and the residue was crystallized from benzene to give 11.6 grams (74%) of colorless plates (I). M.P. 78.5° to 79.5° C. $[\alpha]_D^{22} = -4.5°$ (c. 2.0, MeOH).

*Analysis.*—Calc'd for $C_{12}H_{15}NO_5$ (percent): C: 56.91; H: 5.97; N: 5.53. Found (percent): C: 56.66; H: 5.97; N: 5.47.

Example 4

H-hydroxysuccinimide ester of L(−)-γ-benzyloxycarbonylamino-α-hydroxybutyric acid: A solution of L(−)-γ-benzyloxycarbonylamino-α-hydroxybutyric acid (10.6 grams, 0.042 mole) and N-hydroxysuccinimide (4.8 grams, 0.042 mole) in 200 ml. of ethyl acetate was cooled to 0° C. and added to 8.6 grams (0.042 mole) of dicyclohexylcarbodiimide. The mixture was stirred overnight at 5° C. The dicyclohexylurea which separated was removed by filtration, and the filtrate was concentrated in vacuo. II was obtained as colorless plates. Yield: 13.4 grams (92%). M.P. 117° to 118° C. $[\alpha]_D^{23} = +1.5°$ (c. 2.0, $CHCl_3$).

*Analysis.*—Calc'd for $C_{16}H_{18}N_2O_7$ (percent): C: 54.85; H: 5.18; N: 8.00. Found (percent): C: 54.79; H: 5.21; N: 8.14.

Example 5

N-(benzyloxycarbonyloxy)succinimide: N-hydroxysuccinimide (23 grams, 0.2 mole) was dissolved in 200 ml. of aqueous NaOH solution (9 grams, 0.22 mole). To the stirred solution was added dropwise 34 grams (0.2 mole) of carbobenzoxy chloride with water-cooling. The mixture was stirred overnight at room temperature, and the precipitate which separated was collected by filtration, washed with water, and air dried. Yield: 41.1 grams (82%). Recrystallization from benzene-n-hexane (10:1) gave colorless prisms melting at 78° to 79° C.

Example 6

6'-carbobenzoxy-$DA_1$ and 1,6'-dicarbobenzoxy-$DA_1$: To a solution of 9.1 grams (20 mmoles) of $DA_1$ (Example 1) in 150 ml. of water and 60 ml. of tetrahydrofuran (THF) was slowly added, under vigorous stirring and cooling (5° C.), a solution of 5.17 grams (20.8 mmoles) of N-(benzyloxycarbonyloxy)succinimide in 60 ml. of THF. The mixture was stirred for 24 hours at 5° C. and for an additional 16 hours at room temperature and then concentrated in vacuo to dryness. The crude product thus obtained was roughly separated into two fractions by a preparative counter-current distributor (52 tubes, 100 ml./tube) using a solvent system of n-BuOH-$CHCl_3$-$H_2O$ (4:1:5).

Tube Nos. 1 through 15 were combined and evaporated in vacuo to give 9.75 grams of solid. The solid was dissolved in 20 ml. of water and applied on a column of Amberlite CG–50 ($NH_4^+$ form, 120 ml.). The column was washed with water and then eluted with aqueous N/10 ammonium hydroxide collecting each 20-ml. fraction. Fraction Nos. 62 through 93 were combined and concentrated in vacuo to give 5.75 grams (49%) of 6'-carbobenzoxy-$DA_1$ as a white solid. NMR in $D_2O$ δ5.32 p.p.m. (1H, s.), δ5.87 p.p.m. (1H, d.). TLC [silica gel plate, MeOAc-n-PrOH-28% $NH_4OH$ (45:105:60)] $R_f$ 0.24.

*Analysis.*—Calc'd for $C_{25}H_{40}N_4O_{12} \cdot 3/2H_2O$ (percent): C, 48.77; H, 7.04; N, 9.10. Found (percent): C, 48.92; H, 6.77; N, 9.05.

Tube Nos. 36 through 49 from the above current distribution were combined and evaporated in vacuo to give 2.91 grams of solid. The solid was further purified by silica gel column chromatography developed with methanol-ethyl acetate (4:1) to yield 1.11 grams (7.5%) of 1,6'-dicarbobenzoxy-$DA_1$. TLC [silica gel plate, MeOAc-n-PrOH-28% $NH_4OH$ (45:105:60)] $R_f$ 0.44.

*Analysis.*—Calc'd for $C_{33}H_{46}N_4O_{14} \cdot 2H_2O$ (percent): C, 52.24; H, 6.64; N, 7.38. Found (percent): C, 52.49; H, 6.38; N, 6.81.

EXAMPLE 7

1-[L(−)-γ-amino-α-hydroxybutyryl]-$DA_1$: A solution of 6'-carbobenzoxy-$DA_1$ (588 mg., 1 mmole) in 10 ml. of water and 5 ml. of THF was added dropwise to a solution of N-hydroxysuccinimide ester of L(−)-γ-benzyloxycarbonylamino-α-hydroxybutyric acid (350 mg., 1 mmole) in 5 ml. of THF with stirring and cooling (5° C.). The mixture was stirred overnight at room temperature and then concentrated in vacuo to dryness. The residue was shaken with a mixture of n-butanol-ethyl acetate-water (4:1:5). The upper layer of the solvent mixture was separated and evaporated in vacuo to dryness. The solid thus obtained was dissolved in 30% aqueous ethanol and hydrogenated over 250 mg. of 10% palladium-on-charcoal at room temperature. The reaction mixture was filtered to remove the palladium catalyst, and the filtrate was concentrated in vacuo to dryness. The residual solid was dissolved in 10 ml. of water and chromatographed on a column of CG–50 ($NH_4^+$ form, 40 ml.). The column was washed by water and then eluted fractionally with aqueous N/5 $NH_4OH$. Biologically active fractions which showed $R_f$ 0.20 by TLC were collected, concentrated in vacuo and lyophilized to give 94 mg. (14%) of product as a white solid, which was identified with ambutyrosin A in every respect.

*Analysis.*—Calc'd for $C_{21}H_{41}N_5O_{12} \cdot 2H_2CO_3$ (percent): C, 40.65; H, 6.67; N, 10.31. Found (percent): C, 40.45; H, 6.53; N, 9.96.

Example 8

1-DL-γ-amino-α-hydroxybutyryl-pentofuranosylneamine: DL-γ-amino-α-hydroxybutyric acid was prepared by a published method (Fischer et al., "Chem. Ber.," 43:3272 (1910)). By the procedure of Example 7, 590 mg. (1 millimole) of 6'-carbobenzoxy $DA_1$, from Example 6, was reacted with N-hydroxysuccinimide ester of DL-γ-benzyloxycarbonylamino - α - hydroxybutyric acid (380 mg., 1.08 millimoles) to yield 92 mg. of reaction product having a melting range of 174° C. to 178° C. TLC (S–110) 0.20.

*Analysis.*—Calc'd for $C_{21}H_{41}N_5O_{12} \cdot 2H_2O$ (percent): C, 40.65; H, 6.67; N, 10.31. Found (percent): C, 40.51; H, 5.96; N, 10.16.

We claim:

1. Process for the production of ambutyrosin by selective acylation of 5-β-pentofuranosylneamine, which comprises
    (a) selective blocking of the most active amino group of 5-β-pentofuranosylneamine, having the structure

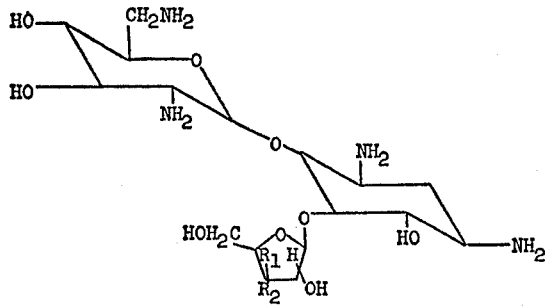

wherein $R_1$ and $R_2$ are hydrogen or hydroxyl, provided they cannot be the same, by reacting said compound with an amino group blocking agent having the structure

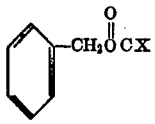

wherein X is chloro, bromo, or iodo, to provide a reaction product having the structure

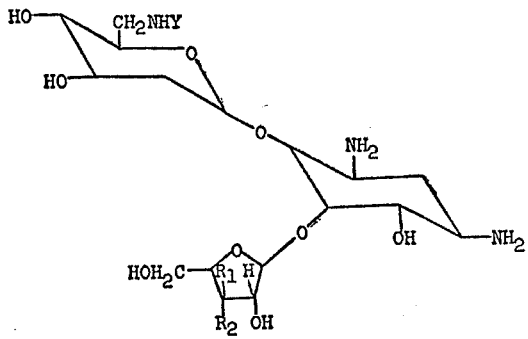

wherein $R_1$ and $R_2$ are as defined above and Y is carbobenzoxy,
    (b) selectively acylating said reaction product by reaction with N-hydroxysuccinimide ester of L(−) benzyloxycarbonylamino-α-hydroxybutyric acid to provide a compound of the structure

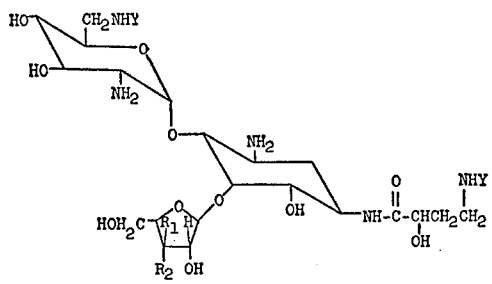

wherein $R_1$ and $R_2$ are as defined, and Y is, in both cases, carbobenzoxy,
    (c) removing carbobenzoxy groups from said compound by catalytic hydrogenation, and
    (d) recovering ambutyrosin.

2. A process for the preparation of ambutyrosin, as described in claim 1, which comprises
    (a) selective reaction of 5-β-D-pentofuranosylneamine with N-(benzyloxycarbonyloxy)succinimide to give 6′-carbobenzoxy-5-β-D-pentofuranosylneamine,
    (b) selectively acylating 6′-carbobenzoxy-5-β-D-pentofuranosylneamine with L(−)-γ-benzyloxycarbonylamino-α-hydroxybutyric acid to give a compound having the structure

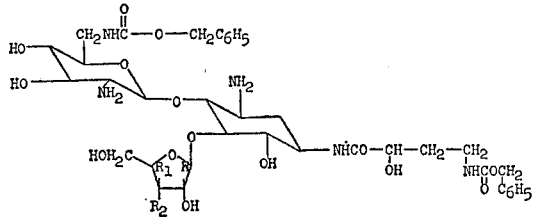

wherein $R_1$ and $R_2$ are selected from the group consisting of hydrogen and hydroxyl,
    (c) catalytically hydrogenating said compound to remove the carbobenzoxy groups, and
    (d) recovering ambutyrosin.

References Cited

UNITED STATES PATENTS

| | | | |
|---|---|---|---|
| 3,454,548 | 7/1969 | Keil et al. | 260—210 R |
| 3,647,779 | 3/1972 | Schmitz | 206—210 R |
| 3,652,535 | 3/1972 | Keil et al. | 260—210 R |

JOHNNIE R. BROWN, Primary Examiner

U.S. Cl. X.R.

260—210 A B